INVENTOR:
CHARLES J. SABONIS,
BY Norman C. Fulmer
HIS ATTORNEY.

United States Patent Office 3,390,903
Patented July 2, 1968

3,390,903
ARRANGEMENT FOR ATTACHING KNOBS TO RADIOS AND THE LIKE
Charles J. Sabonis, Utica, N.Y., assignor to General Electric Company, a corporation of New York
Filed Jan. 3, 1966, Ser. No. 518,055
3 Claims. (Cl. 287—53)

ABSTRACT OF THE DISCLOSURE

A knob for radios and the like including a hub having a radial rib extending outwardly therefrom, the hub being received by an opening including an arcuate flexible rib positioned within and radially inwardly spaced from the periphery of the opening. The rib defines an opening having a diameter less than that of the hub and the associated ribs so that the knob can be snapped into the opening and retained therein by the rib.

---

Figure 1:
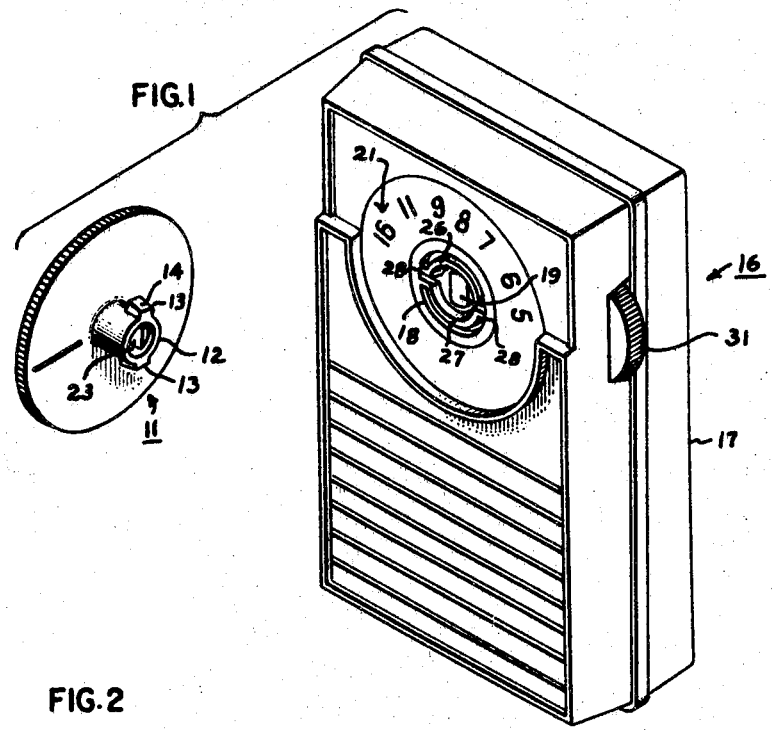

This invention relates to arrangements for attaching knobs to radios and the like.

Various arrangements have been used for attaching knobs to radios and other devices, and customarily a fastening device such as a screw or clamping arrangement is employed for fastening the knob in place on a tuning or control shaft. The use of the aforesaid fastening devices produces a pressure or strain in the knob which undesirably tends to cause eventual breakage or cracking if the knob is made of low-cost material such as plastic.

An object of the invention is to provide an improved arrangement for attaching knobs to radios.

Another object is to provide an arrangement for attaching knobs to radios, which does not require any fastening devices.

A further object is to provide a knob attachment arrangement which is simple, inexpensive, and which does not produce pressure in the knob.

Additional objects will be apparent from the following description and claims, and from the accompanying drawing.

The invention comprises, briefly and in a preferred embodiment, a knob provided with a hub extending therefrom and containing an opening adapted to fit over a control shaft, this opening being shaped with respect to the shaft to cause rotation of the knob to rotate the shaft. At least one radially outwardly-extending rib is provided on the hub, and the outer surface thereof is tapered inwardly toward the free end of the hub. The cabinet to which the knob is to be attached comprises an opening in alignment with the control shaft. One or more arcuate flexible ribs, preferably formed integrally with the cabinet, are provided within the opening and define an auxiliary opening having a diameter greater than that of the knob hub and less than the diameter of the hub and its outwardly extending ribs. The knob is quickly and easily attached to the cabinet and control shaft, by placing the knob so that its hub is in alignment with the control shaft, and pushing it over the end of the shaft, whereupon the tapered ribs deflect the flexible ribs and enter through the auxiliary opening, whereupon the flexible ribs return to normal position behind the tapered ribs, thus locking the knob to the cabinet and onto the control shaft. That is, the knob is simply "snapped" into place.

Figure 2:
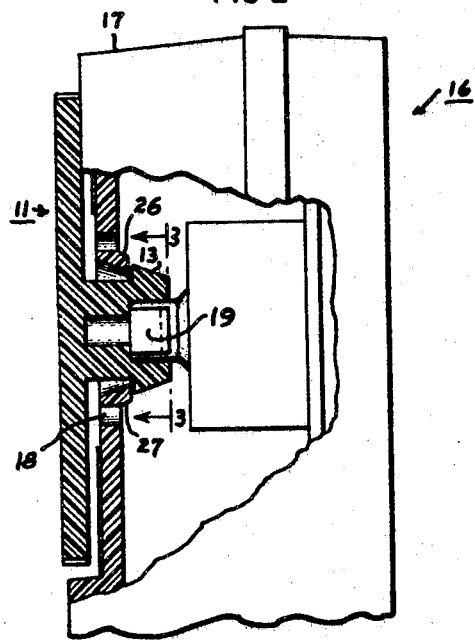
Figure 3:
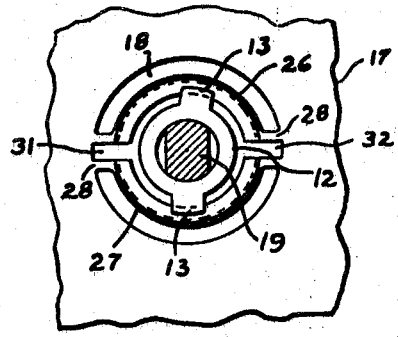

In the drawing:

FIG. 1 is an exploded view of a knob and cabinet in accordance with a preferred embodiment of the invention, FIG. 2 is a side view, partly in cross-section, showing the knob and cabient of FIG. 1 in assembled condition, and FIG. 3 is a cross-sectional view taken on the line 3—3 of FIG. 2.

A knob 11 is provided with a rearwardly extending hub 12 of reduced diameter and carrying one or more outwardly-extending radial ribs 13. The outer surfaces 14 of the ribs 13 are tapered inwardly toward the open end of the hub 12. A radio 16 or similar device comprises a cabinet 17 having an opening 18 therethrough in alignment with a control shaft 19 contained in the radio 16. The shaft 19 may be, for example, a tuning shaft, and there may be frequency indicia 21 arranged about the opening 18. The shaft 19 has a noncircular cross-sectional shape, and the opening 23 in the hub 12 has a corresponding cross-sectional shape so as to fit over the shaft 19 and cause the shaft to be rotated when the knob 11 is rotated.

One or more arcuate flexible ribs are arranged within the opening 18. In the example shown in the drawing, two arcuate flexible ribs 26 and 27 are provided, each of these ribs defining approximately a half-circle joined at the ends 28 thereof to the wall of the opening 18. The arcuate flexible ribs 26 and 27 define a circular auxiliary opening adapted to receive the hub 12, but smaller in diameter than the overall diameter of the hub 12 and the radial ribs 13.

Other controls, such as a volume control 31, normally are provided on the radio 16.

Preferably the cabinet 17 is molded from slightly resilient plastic, with the flexible ribs 26 and 27 being integrally molded as a part thereof. The knob 11 also preferably is made from plastic.

The knob 11 is quickly and easily attached to the cabinet 17 and the control shaft 19 by placing the knob so that its hub is in alignment with the control shaft, and then pushing it over the end of the shaft whereupon the tapered ribs 13 force and deflect the flexible ribs 26, 27 apart and enter through the auxiliary opening, whereupon the flexible ribs 26, 27 return to their normal position behind the tapered ribs 13, thus locking the knob 11 to the cabinet 17 and onto the control shaft 19. Although the knob 11 is securely locked to the cabinet 17, it can be readily rotated thereby causing rotation of the control shaft 19. Alternatively, the knob can be first attached to the cabinet and then the shaft 19 can be inserted into the hub opening 23. As clearly shown in FIG. 3, if two tapered ribs 13 are provided on the hub 12, and there are two flexible ribs 26, 27 arranged so there are diametrically opposed open spaces 31, 32 between their ends, then the two tapered ribs 13 preferably are offset from being diametrically opposed so that the ribs 13 cannot simultaneously be in alignment with the open spaces 31 and 32 and fall therethrough in the event that the ribs 13 are thinner than the open spaces 31, 32.

It will readily be understood that the invention achieves its objective of providing an inexpensive and quickly assembled knob arrangement which does not require the use of screws or other clamping or fastening devices which would cause pressure or stress in the knob or its hub 12. Since there is no permanent pressure or strain induced in the knob of the invention, it achieves long life without cracking or breaking.

While a preferred embodiment of the invention has been shown and described, various other embodiments and modifications thereof will be apparent to those skilled in the art, and will fall within the scope of invention as defined in the following claims.

What I claim is:

1. An arrangement for attaching a knob to a housing and to a control shaft therein, comprising a knob provided with a hub extending therefrom provided with an opening adapted to fit over said control shaft for rotating same, said hub being provided with at least one rib extending radially therefrom, said housing being provided with an opening aligned with said control shaft, at least one arcuate flexible rib being provided within and radially inwardly spaced from the periphery of said opening and said rib being joined to the periphery of said opening at each end of its arcuate extent and shaped to provide an auxiliary opening having a diameter greater than said hub and less than the combined diameter of said hub and rib, so that when said knob is inserted with its hub through said auxiliary opening it locks in place on the housing when said rib thereof passes past said flexible rib.

2. An arrangement as claimed in claim 1, in which said radially extending rib is tapered inwardly toward the free end of said hub.

3. An arrangement as claimed in claim 1, in which said housing is made from resilient material and said arcuate flexible rib is formed integrally therein.

References Cited

UNITED STATES PATENTS

| | | |
|---|---|---|
| 2,294,686 | 9/1942 | Newman. |
| 2,651,281 | 9/1953 | Nathan _____ 248—27 XR |
| 2,706,774 | 4/1955 | Bowman _____ 287—534 XR |
| 2,937,834 | 5/1960 | Orenick et al. _____ 85—81 XR |
| 3,033,624 | 5/1962 | Biesecker. |
| 3,082,642 | 3/1963 | Hammerand _____ 74—553 XR |
| 3,164,418 | 1/1965 | Biesecker _____ 85—81 XR |
| 3,303,717 | 2/1967 | Valenti _____ 74—553 |

EDWARD C. ALLEN, *Primary Examiner.*

CARL W. TOMLIN, *Examiner.*

A. KUNDRAT, *Assistant Examiner.*